March 31, 1959  R. D. HENDERSON  2,879,667
WHEEL BALANCING DEVICE
Filed March 21, 1955  5 Sheets-Sheet 3

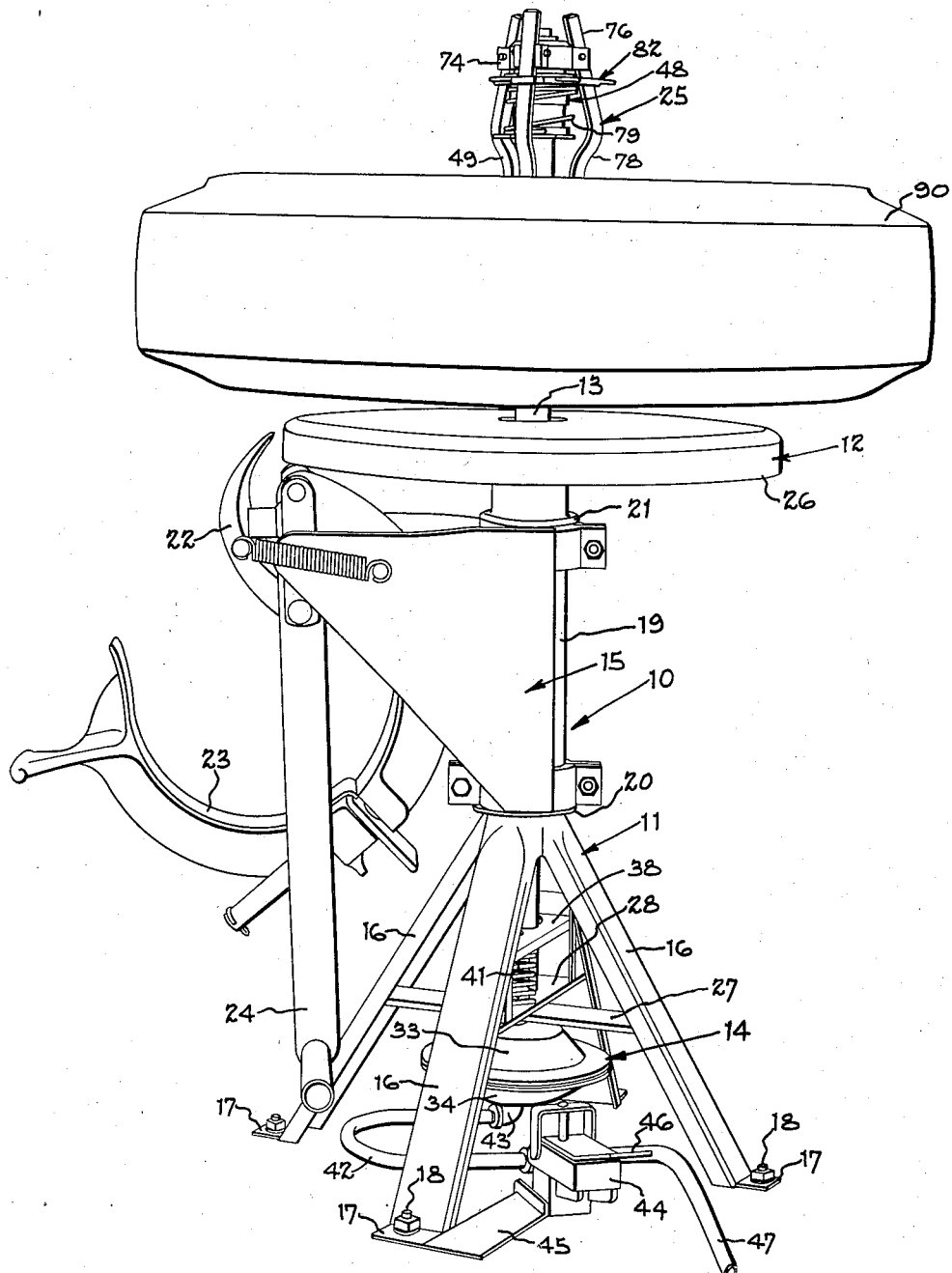

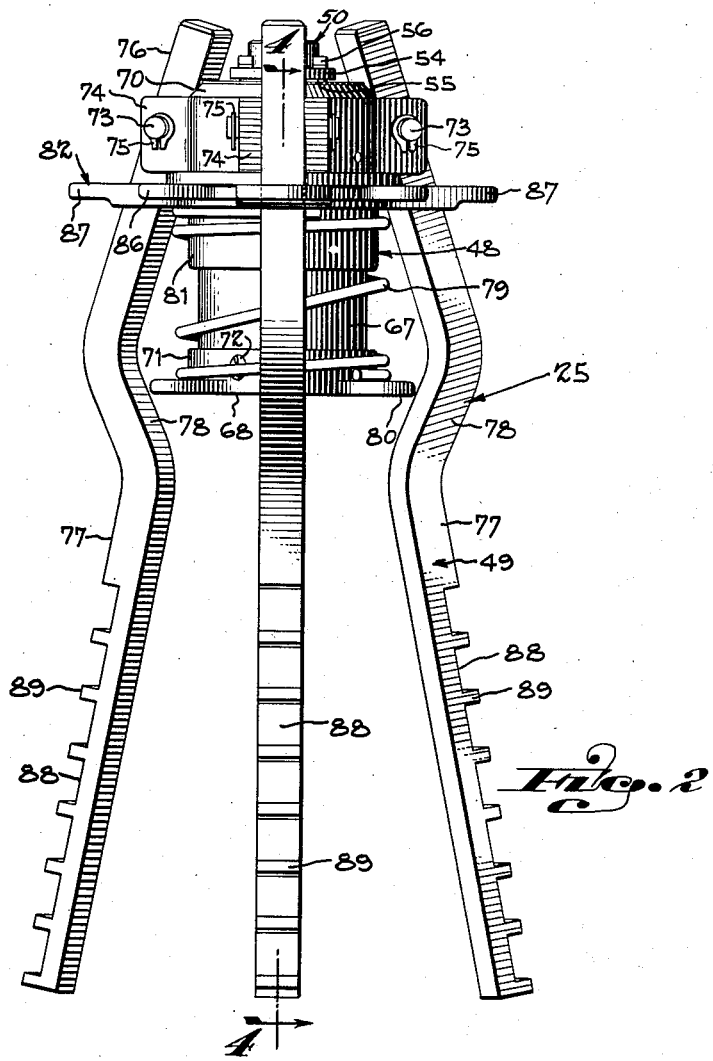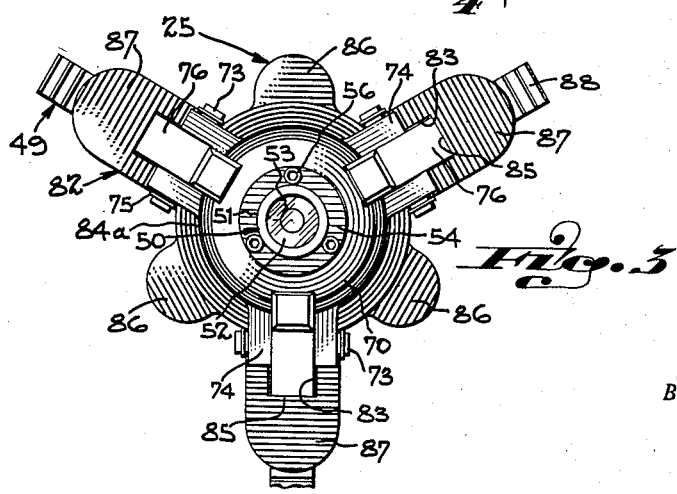

INVENTOR.
Robert D. Henderson.
BY Wood, Herron & Evans.
ATTORNEYS.

March 31, 1959 R. D. HENDERSON 2,879,667
WHEEL BALANCING DEVICE
Filed March 21, 1955 5 Sheets-Sheet 5

INVENTOR.
Robert D. Henderson.
BY
Wood, Herron & Evans.
ATTORNEYS.

United States Patent Office 2,879,667
Patented Mar. 31, 1959

2,879,667

WHEEL BALANCING DEVICE

Robert D. Henderson, Cincinnati, Ohio

Application March 21, 1955, Serial No. 495,508

9 Claims. (Cl. 73—483)

This invention relates to devices which are used in the balancing of vehicle wheel and tire assemblies. More specifically, the invention is directed to a balancing device which is adapted to be engaged in the hub opening of a wheel and tire assembly to freely suspend the assembly horizontally from a post or from a similar structure. Thus suspended, the assembly is free to tip if an out of balance condition is present, which condition is reflected by the position of a bubble in a level mounted on top of the balancing device.

The principal objective of the invention is to provide a simple and inexpensive, yet highly accurate balancing device which is adapted to be used as an attachment to a tire changer machine of the type disclosed in co-pending patent application Serial No. 388,149, filed October 26, 1953, now Patent No. 2,808,860.

Such a machine consists essentially of a table, a stand to support the table at a convenient height, means to clamp a wheel and tire assembly onto the table, and tire mounting and demounting apparatus. The machine includes, as part of the wheel clamping means, a vertically shiftable post which extends upwardly from the center of the table and which projects through the hub opening of a wheel mounted on the table. The post normally is biased toward an elevated position. However, a power cylinder is provided to forcibly lower the post in order to clamp a wheel onto the table. For this purpose, the post receives a clamping element which engages the inner marginal edge of the hub opening in the wheel. The clamping element is released and may be removed from the post when the power cylinder is decommissioned, which permits the post to rise.

The balancing device of this invention is adapted to be seated upon the top of the center post, when the clamp element is removed, to balance a wheel and tire assembly immediately after the tire has been mounted and while the assembly is still resting upon the table of the machine. Thus, the heretofore time consuming and comparatively costly operation of balancing a wheel and tire assembly is simplified to a point where it becomes part of the routine of repairing a tire or of mounting a new tire upon a wheel.

A further objective of the invention is to provide a balancing device which may be quickly and easily attached to a wheel. In the preferred embodiment, the device consists of a head which fits over the top of the center post, a universal pivot which permits the head to tilt freely with respect to the post, and three notched legs which depend from the head and which are adapted to be engaged in the hub opening of a wheel resting upon the table. The legs are pivotally mounted upon the head for swinging movement in planes which radiate from the central axis of the wheel. Normally, the legs of the device are biased outwardly by spring means. However, means are provided to swing the legs inwardly, which means are mounted on the head of the device such that the legs may be actuated by the operator when he grasps the head to place the device on the center post. Once the head is seated upon the post and released by the operator, the legs swing outwardly, automatically seeking the edge of the hub opening of the wheel and automatically adjusting themselves to the size of the opening. Moreover, each leg depends from the head and is angulated inwardly at a point below the head, whereby the lower endwise portion of the leg, which is straight, may be swung inwardly beneath the head at the time the device is being seated upon the center post, to closely embrace the post. In this way, the legs may be engaged into the hub opening of the smallest wheel which is now being used on automobiles.

Other objectives and various features of the present invention will be readily apparent from the following detailed description of the drawings in which;

Figure 1 is a perspective view showing a wheel and tire assembly suspended from the center post of a tire changer machine by means of the balancing device of this invention.

Figure 2 is a side elevational view of the balancing device.

Figure 3 is a top plan view thereof.

Figure 4:
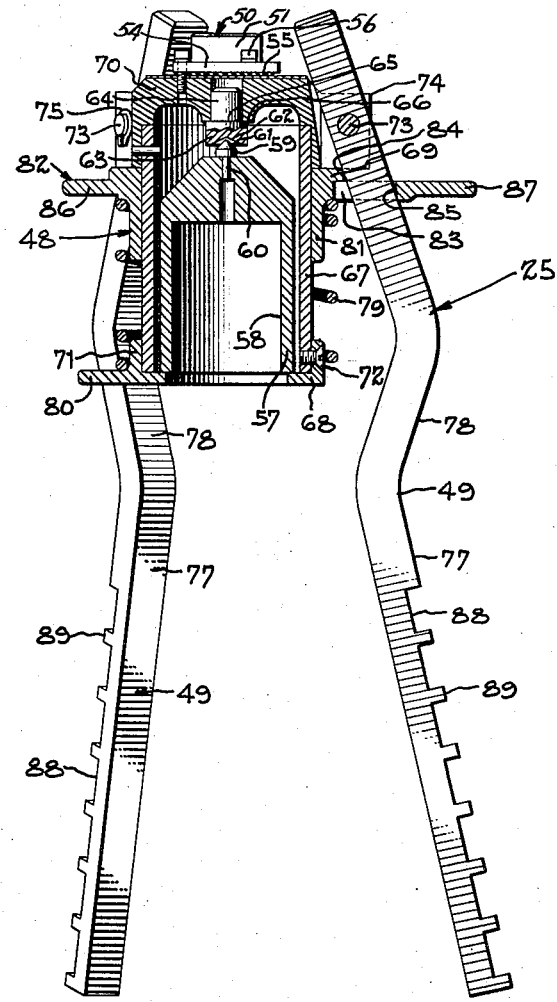
Figure 4 is a cross sectional view of the balancing device taken on the line 4—4 of Figure 2.

The numeral 10 is used in Figure 1 to designate generally a tire changer machine. This machine consists essentially of a pedestal, indicated generally at 11, a table or support member 12, a post 13, a fluid operated clamping device, indicated generally at 14, and a bead breaking assembly, indicated generally at 15.

The pedestal 11 of the machine furnishes a support by which the table 12 is mounted rigidly at a convenient level above the floor and it also furnishes a standard or frame on which the other parts of the machine are mounted. In the construction shown, the pedestal consists of four rigid legs 16 which may be angle or channel-shaped in cross section and which are provided with feet 17 through which the pedestal may be bolted in level condition to a floor by means of bolts 18. The lower, leg portion of the pedestal preferably is of pyramid form, the upper ends of legs 16 being welded to the lower end of a cylindrical column 19. The column, just above its juncture with the legs, is provided with a collar 20 to support the bead breaking mechanism 15, which is rotatably mounted upon the column. A second collar 21 is provided adjacent to the upper end of column 19, just below table 12, to prevent the bead breaking mechanism from moving upwardly on the column during use.

The bead breaking mechanism 15 is disclosed in United States Patents Nos. 2,609,038 and 2,609,039 and consists of a lower bead breaker 22, an upper bead breaker 23 and a hand operated lever 24 which, upon being swung upwardly to the left as seen in Figure 1, actuates both bead breakers. In view of the complete disclosure of the bead breaking mechanism in the two patents, it is believed unnecessary to go into greater detail concerning its construction and operation.

The center post 13 is movable by the fluid operated clamping device 14 from an elevated position to a lowered, clamping position. The general construction of the clamping device is similar to the one which is disclosed in copending patent application Serial No. 388,149, filed October 26, 1953, now Patent No. 2,808,860. The primary function of the clamping device is to center and securely lock a vehicle wheel having a tire thereon onto the table 12. Locking occurs upon the downward movement of the center post. In the present case, upward movement of the center post is utilized for balancing wheel and tire assemblies on the machine by means of the balancing device which is indicated generally at 25.

The table 12 constitutes a support against which the vehicle wheel is clamped while its tire is being mounted or demounted, the wheel being confined under pressure between the table and a clamp (not shown) which is secured to the center post. Hence, the table is fastened rigidly to the upper end of column 19, being suitably reinforced by bracing which connects the underside of the table to the column. In the preferred construction, table 12 is of circular form and its outer periphery is provided with a downturned flange 26, the diameter of the table being slightly greater than the diameter across the rim of the largest vehicle wheel which the machine is intended to accommodate. In such an arrangment, the upper surface of the table furnishes the support for the wheel rim during clamping, whereas the flange 26 and the adjacent table edge provide guide surfaces which cooperate with the bead breaker mechanism as explained in the patents to which reference has been made. As disclosed in the copending application, now Patent No. 2,808,860, the center post 13 extends upwardly through column 19 and through a central opening in the table to project through the hub opening of a wheel and tire assembly resting upon the top of the table.

The power clamping means is associated with the center post below the table, and consists essentially of a power cylinder which is connected to the post and which cooperates with a "piston" element which is fixed against movement by connection to the pedestal. Specifically, a cross brace 27 is welded to opposed legs 16 of the pedestal at a suitable distance above the floor. A second cross brace 28 placed above the first cross brace and extending at right angles to it is welded to the other two opposed legs of the pedestal for additional rigidity. The "piston" or reaction member of the power cylinder consists of a disk 29 of substantial diameter which is fastened to a rod 30 which, at its upper end, is fastened to the cross braces 27 and 28 so as to be immovable. In the construction shown, the rod 30 is threaded at its upper end and carries a nut 31 which is tightened down onto the upper surface of cross brace 28.

Figure 8:
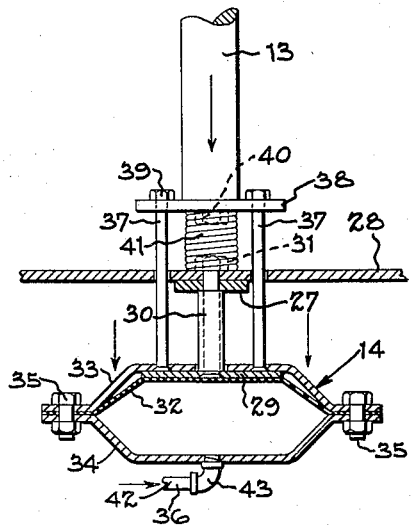
Figure 8 is a fragmentary cross sectional view of the fluid operated clamping device which is employed in the tire changer machine. In this view the device is shown in clamping position.
Figure 9:
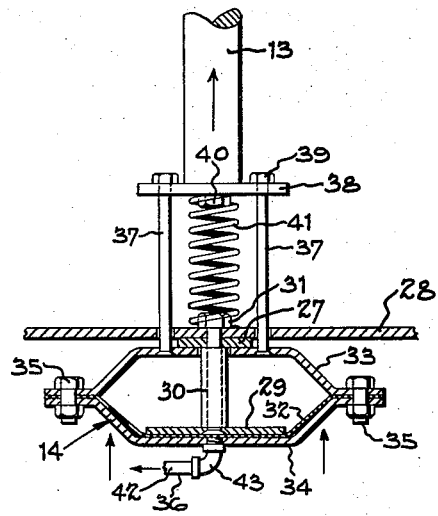
Figure 9 is a view similar to Figure 8 showing the fluid operated clamping device in released condition.

The power cylinder includes a circular diaphragm 32 formed of rubber or other elastic material having its marginal edge clamped between opposed upper and lower casing members 33 and 34, the casing members and diaphragm being held together by a series of bolts 35 at the peripheral edge of the assembly. Both casing members 33 and 34 are dish-shaped and the piston disk is seated upon the upper surface of the diaphragm. It will be seen, therefore, that admission of fluid under pressure, as through an inlet 36, into the chamber between the diaphragm and the lower casing member 34 (see Figures 8 and 9) will cause downward movement of the cylindrical assembly with respect to the fixed piston disk 29.

The upper casing member 33 is bored to receive a pair of connector bolts 37—37 which also pass through clearance bores in the cross brace 28. The heads of the bolts are loacted at the inside of the upper casing 33, while the upper end portions of the bolts pass through a cross piece 38 and have nuts 39 threaded upon them which engage the upper surface of the cross piece. Cross piece 38 is rigidly connected to the underside of center post 13 by means of a bolt 40 which is threaded into a taped bore in the bottom of the post.

A substantially heavy compression spring 41 is seated at its upper end against the under side of cross piece 38 surrounding the head of bolt 40. The lower end of this spring seats against cross brace 28 surrounding the nut 31 which is threaded onto the upper end of connector rod 30. It will be seen, therefore, that the admission of fluid pressure into the space in the lower casing 34 below diaphragm 32 causes the power cylinder to move downwardly with respect to the fixed piston disk 29, thereby pulling the connector bolts 37—37 downwardly against the bias of spring 41. Cross piece 38, which is anchored to bolts 37, is thereby caused to move downwardly and it carries the center post 13 with it. Upward movement of the center post occurs upon the release of such fluid pressure under the action of compression spring 41. Inasmuch as such upward movement is employed in the present instance to lift a wheel and tire assembly, the spring must be sufficiently strong to overcome the weight and attendant friction in lifting the heaviest wheel and tire assembly for which the balancer device of this invention is used.

Any suitable source of fluid under pressure may be employed to operate the apparatus, and the fluid pressure may be admitted in any suitable manner. However, most filling stations wherein tire changing operations are conducted are equipped with a compressed air system and the present apparatus has been particularly constructed to facilitate the application of air pressure to the center post actuator. For this purpose a flexible hose 42 is connected by means of an elbow pipe 43 into casing 34. It is preferred that the hose be connected to a foot operated air valve 44 which may be fastened to one of the legs 16 by means such as a bracket 45 to hold it in place. In the instance shown, the valve 44 is operated by means of a foot treadle 46 and is constituted so that air from a supply conduit 47 is admitted into flexible hose 42 to forcibly lower the center post when the foot treadle is depressed. The valve is further arranged so that raising the foot treadle exhausts the air from the power cylinder to permit the center post to be raised by spring 41.

The provision of a foot valve for the tire changer machine constitutes a modification in the construction of the machine shown in copending application Serial No. 388,149, now Patent No. 2,808,860. In the machine disclosed in the application, air is admitted to the actuator cylinder through a passageway extending downwardly through a hollow center post. In addition, a substantially stronger spring is employed to elevate the center post in the present case. Other than these differences, the construction of the air cylinder and its operation are substantially identical to the disclosure of Patent No. 2,808,860.

The balancing device 25 consists of a head, indicated generally at 48 which seats upon the upper end of the center post 13, means, such as three legs 49, for attaching the balancing device to a vehicle wheel which is resting upon the table 12 of the tire changer, and a bubble level 50 which is mounted on top of the balancer. The level employed is one which is commercially available. It consists of a circular box 51 which has a glass top 52, the under surface of which is curved on a large radius. The glass top has a circle 53 etched in it which coincides with the centered position of the bubble when the level is horizontal. The level preferably is a sensitive one, indicating a deviation of as little as fifteen minutes of a degree in angular movement from the horizontal. The circular box of the level has a base flange 54 thereon which seats on top of the head 48 of the balancer device. It will be noted from Figure 4 that a circular rubber pad 55 is sandwiched between the level and the top of the head. In addition, the base flange is bolted to the head by three screws 56 which pass through appropriate bores in the flange and which thread into tapped holes in the head. The rubber pad provides a convenient method of truing-up the level should this become necessary. This is done by adjusting the screws 56 thereby compressing the pad to change the angulation of the level relative to head 48. It is preferred that Allen head screws be employed, not only because they may be adjusted with a great degree of accuracy, but because they are less likely to be tampered with than ordinary slotted head type screws.

More specifically, the head of the balancing device encloses a socket piece 57 which fits over the top of the center post of the tire changer. For this purpose, the socket piece is hollow having a substantially large cylindrical bore 58 in its underside which is of such size that it may engage over the upper end of the center post 13 in a slip-fit relationship. The upper end of the socket piece is closed and it terminates in a conical top. Centered at the top of the piece is a hardened steel balance pin 59 having a shank 60 thereon which is press-fitted into a bore in the top of the piece. The head of the balance pin 59 is substantially larger than shank 60 and it tapers upwardly to a rounded point 61. Balance pin 59 engages a conical seat 62 which is formed in the underside of a hardened stud 63, which stud includes a shank 64 engaged in a bore in the underside of the top of head 48 in tight press-fit relationship. The seat portion of stud 63 is substantially greater in diameter than shank 64 to provide a shoulder 65 which rests against a boss 66 formed on the underside of the top of head 48. The pin 59 and stud 63, therefore, provide a universal pivot for the device which permits the head to tilt freely in all directions with respect to the vertical axis of the post upon which it is seated.

The head portion of the balancer device in the preferred embodiment is made in four parts, consisting of a hollow cylinder or barrel 67 which encloses socket piece 57, a flanged ring 68, which is secured to the lower end of cylinder 67, a spreader ring 69 which is slidably mounted on the outside of cylinder 67, and a cap 70 which is pinned to and encloses the top of barrel 67. The hardened seat 62 is mounted in the latter part of the head. More specifically, the inside diameter of the cylinder or barrel 67 is larger than the outside diameter of the socket piece 57 to provide clearance between the two. This clearance permits the head to tilt on the universal pivot relative to the center post 13 of the tire changer for indicating out of balance conditions in wheel and tire assemblies being tested. The clearance does not have to be more than ⅛" at the sides of the socket piece, however, due to the sensitivity of the level which is employed.

The socket piece 57 is held in place inside of cylinder 67 by means of the flanged ring 68. The inside diameter of the flange ring is smaller than the outside diameter of socket piece 57, but it is large enough to permit the top of the center post to enter into the socket piece. An annular flange 71 extends upwardly from ring 68 to embrace the lower end of the barrel. Means such as bolts 72, which are countersunk in annular flange 71 and which thread into tapped bores in the lower end of barrel 67, may be employed to secure the flanged ring in place on the barrel.

The legs 49 which are used to suspend a vehicle wheel and tire assembly from the head of the balancing device are pivotally attached to the cap 70 which enclosed the top of cylinder 67. Each leg may be formed from a cold rolled steel bar which is square in cross section. Three legs are provided, being disposed at 120° to one another around the cap. Each leg is attached to the cap by means of a pin 73. This pin passes through an appropriate bore in the leg and is journalled at its respective opposite ends in a pair of lugs 74 which constitute a clevis structure embracing the opposite sides of the leg. The pin is held in the lugs by means of a pair of split snap-on rings 75 which are engaged in grooves formed respectively at the opposite ends of the pin. In addition, the clevis structures and the pins 73 fit the legs closely so as to prevent lateral shifting of the legs relative to the head of the balancer. Preferably, the upper end of each leg projects upwardly beyond the cap 70 to a point substantially above the top of the bubble level, in this way the legs protect the sensitive level against breakage or damage in the event the balancing device is accidentally dropped. In the construction shown, but not necessarily, the legs are pivoted for swinging in planes extending radially from the axis of the head.

Each one of the three legs in the embodiment illustrated, has a straight upper portion 76 and a straight lower portion 77. There are two parts of the leg that are offset with respect to one another, being joined by an angularly disposed connector portion 78. The angle between the upper part of the leg and the connector portion is less than the angle between the lower part of the leg and the connector portion by approximately seven degrees. In the construction shown in the drawings, this angulation permits the lower straight portion 77 of each leg to be swung inwardly underneath the head to a point where its inner surface is substantially vertical. In this condition, the three legs are parallel to one another, but still spaced apart to provide clearance for the center post.

The three legs are normally biased toward the spread condition illustrated in Figure 2 by means of a coil spring 79. This spring surrounds the barrel 67 of the balancer head, being seated at its lower end on the flanged ring 68 and being seated at its upper end against the under side of the spreader ring 69. Three ears, each of which is designated 80, are provided on the flanged ring to seat the lower end of the coil spring. These ears also are used in the manipulation of the legs as will be described. The coil spring 79 serves to urge the spreader ring upwardly into engagement with the lower marginal edge of the cap 70. Spreader ring 69 comprises an annular, depending skirt 81 which is slidable vertically upon the outside of cylinder or barrel 67. The fit between the skirt and the barrel should be a close one (.005" clearance, approximately) so as to prevent the spreader ring from canting with respect to the barrel. Spaced around the upper end of the spreader ring at 120° with respect to one another are three cam lugs, each of which is designated 82. Each cam lug has a radial slot 83 therein through which the upper part of a leg passes. The respective sides of each slot 83 may clear the sides of the leg; however, the inner edge 84 of each slot provides a cam surface which resides against the inner surface of the leg to urge it outwardly into the spread condition shown in Figure 2 under the biasing action of spring 79, whereas the outer edge 85 of the slot provides a cam surface which swings the leg inwardly when the spreader ring is manually depressed against the bias of spring 79. As shown in Figure 3, the respective cam surfaces 84 are part of a continuous shoulder 84a which encircles the upper end of the spreader ring. The spreader ring also includes three ears 86 which extend radially outwardly from the upper end of the spreader ring. These three ears are disposed respectively between adjacent cam flanges and are directly above the ears 80 which are on the flanged ring 68. In addition, each one of the cam lugs may extend radially outwardly substantially beyond the leg to provide an ear portion 87. The respective upper and lower ears provide a means of grasping the balancing device and compressing the coil spring 79 to move the spreader ring downwardly on barrel 67. In this way the three legs are swung inwardly toward one another simultaneously as the respective cam surfaces 85 ride downwardly upon the outer surface of each leg.

The outer face of each leg in the lower part thereof is configured to provide a plurality of rectangular notches 88, these notches being defined one from another by teeth 89. Preferably, the lower part of each leg is hardened by heat treatment. The notches are provided to engage the inner edge of the central opening of a vehicle wheel in order to fasten the wheel to the balancing device as will be more specifically set forth in the description of the operation of the device which follows.

Figure 5:
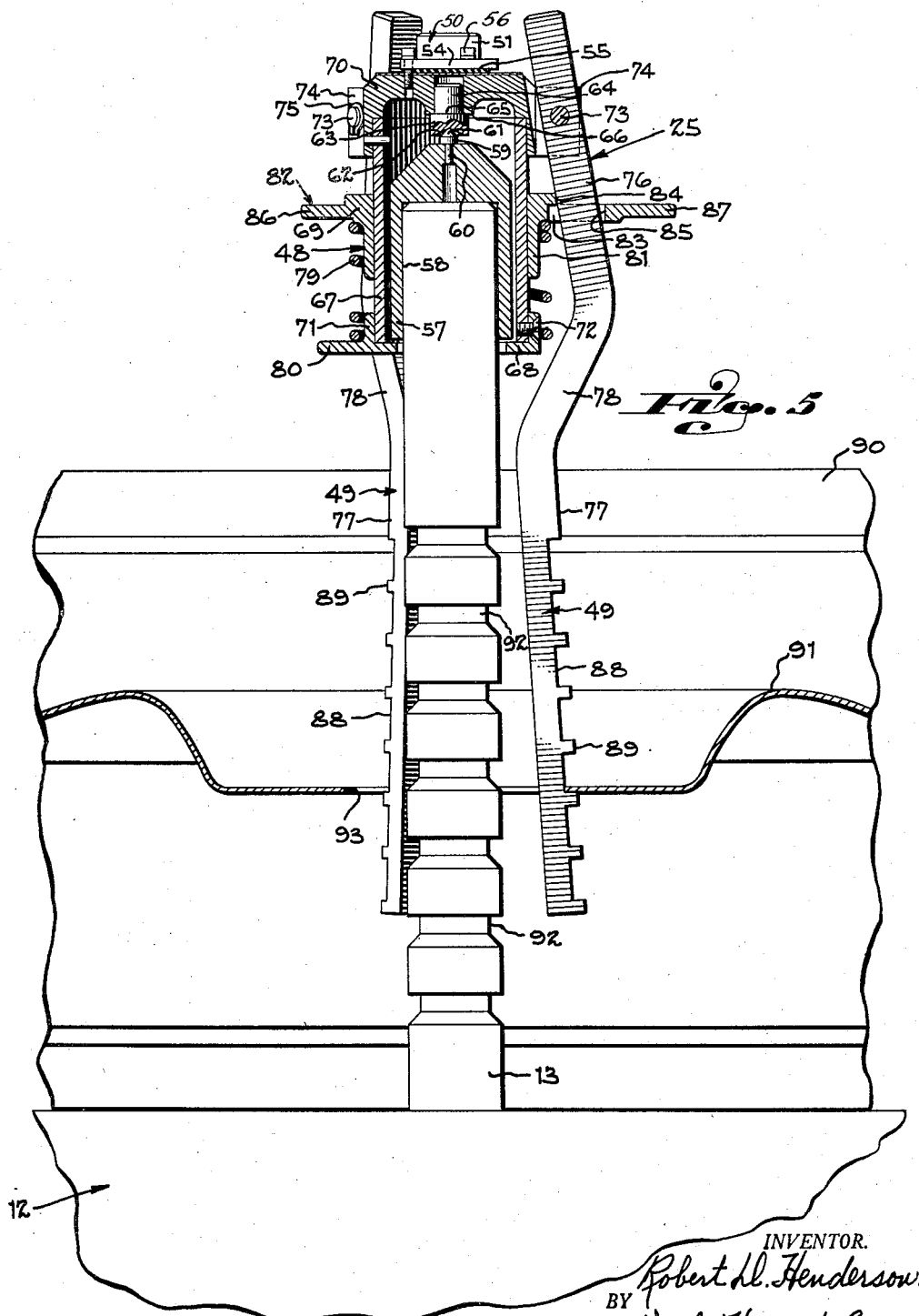
Figure 5 is a cross sectional view similar to Figure 4 showing the balancing device in place on the center post of a tire changer, and engaged with the edge of the hub opening of a wheel and tire assembly which is resting upon the table of the tire changer.

It will be assumed that the service station attendant has just completed the mounting operation of a tire 90 upon a wheel 91. At this time, the wheel is still rigidly secured onto the table by means of the clamp which is locked in place by a removable fastner, the fastner being engaged in the annular grooves 92 formed in the center post. The attendant first relieves the air pressure in the lower casing member 34 of the power cylinder by lifting the foot treadle 46 with the toe of his shoe. This permits the center post to be raised by the heavy coil spring 41. With the pressure on the center post relieved, the clamp may be removed from the center post, leaving the post free to receive the balancer device. The foot treadle of valve 44 then is stepped upon to again lower the center post by fluid pressure. The attendant then may take the balancer device and by gripping the ears which are on the spreader ring and upon the flanged ring respectively, he may depress coil spring 79 to swing the legs inwardly toward one another under the head 48. The legs are so related to the head of the device that the lower parts thereof are parallel to one another when the lower edge of skirt 81 strikes the upper edge of the annular flange 71 of flanged ring 68. In this condition, the legs are spaced apart sufficiently far to permit the balancer device to be lowered over the center post 13 of the tire changer machine to seat the socket piece 57 on top of the post as shown in Figure 5. With the socket piece thus seated, the attendant may release his grip upon the balancer. This permits the coil spring 79 to raise the spreader ring 69, which cams the three legs radially outwardly to bring the notches 88 into engagement with edge 93 of the hub opening, see Figure 5. If it is found that the teeth on the legs strike the edge of the hub opening, the balancing device may be raised slightly.

With the balancer device thus attached to the wheel, the attendant may raise the foot treadle of the fluid operated air valve to exhaust the air from the power cylinder. This permits heavy coil spring 41 to raise the center post. The upward travel of the center post does not have to be appreciably greater than one or two inches in order to lift the wheel and tire assembly clear of the table 12. Once the wheel is clear, its weight is carried by the point of the balance pin 59 and any out of balance condition will cause the wheel and tire assembly to tilt toward the heavy side. The degree of tilt and the direction are reflected in the position of the bubble relative to the circle etched on the glass top 52 of the level. Appropriate counter-balance weight then may be attached to the wheel in the usual manner to bring the assembly into a condition of static balance.

Figure 6:
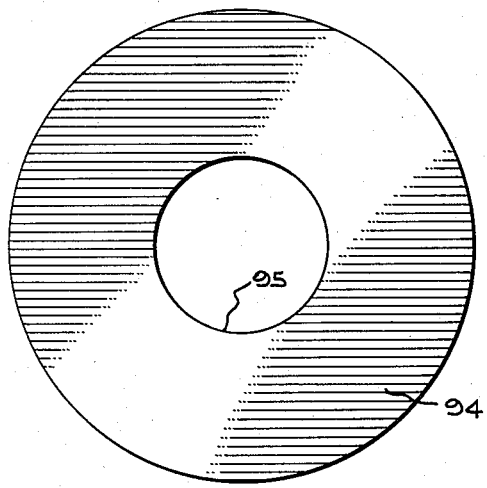
Figure 6 is a top plan view of a test disk which may be used to check the accuracy of the balancing device.
Figure 7:
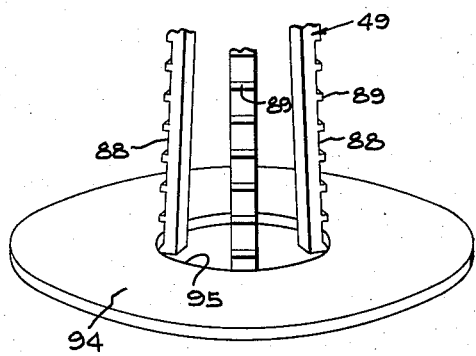
Figure 7 is a fragmentary elevational view showing the test disk of Figure 6 suspended from the balancing device.

It is anticipated that long or abusive use of the balancer device will affect the accuracy of the bubble level. It is recommended therefore that the device be checked periodically by means of a balanced test disk such as the one designated 94 in Figure 6. This disk may be made of cold rolled steel or other heavy material which is not likely to be distorted through use. The disk may be approximately 10 or more inches in diameter and have a central opening 95 in it which is concentric to the outer rim of the disk and which is sufficiently large to be engaged onto the legs of the balancer device, as shown in Figure 7. The test should be made on the center post of the tire changer machine. If it is found that the bubble is not aligned exactly with the etched circle on the glass top of the level, one or more of the three bolts 56 may be adjusted to compress or relax the rubber pad 55 which is interposed between the level and the top of the head to realign the bubble with the circle.

From the above, it will be seen that I have provided a wheel and tire balancing device which may be used with a tire changer machine whereby a wheel and tire assembly may be quickly and accurately balanced by a service station attendant as part of a tire changing operation. By using the tire changer stand, the balancing operation may be carried out at a convenient height. Furthermore, the attendant does not have to lift or otherwise handle the heavy assembly during the balancing operation. The elevatable center post carries all of the weight, and the clamping device which is used during the demounting and mounting operation insures that the wheel is already centered upon the table at the time the balancer is to be used. Insofar as the utility of the present device is concerned, it is not necessary that the center post of the machine be shiftable. Obviously, it is the relative movement between the center post and the supporting table which frees the assembly so that it may be suspended from the balancing device. Furthermore, the table may be any horizontal structure which will support a tire and wheel assembly.

Having described my invention, I claim:

1. A device for balancing vehicle wheel and tire assemblies, said device comprising a socket piece adapted to be engaged upon the upper end of a post, a universal pivot at the top of said socket piece, a cylindrical head seated upon said universal pivot, a bubble level mounted upon said head, a plurality of legs pivotally attached to said head at points spaced equally around the circumference of said head, each of said legs being angulated inwardly below said head whereby the lower ends of the respective legs may be swung radially inwardly toward one another beneath said head, a leg actuator slideably mounted upon said head, yieldable means normally biasing the said actuator toward an elevated position on said head, cam means on said actuator positioned to engage the inner sides of said legs to spread them radially outwardly when the actuator is biased toward said elevated position, additional cam means on said actuator positioned to engage the outer sides of said legs to swing said legs inwardly when the actuator is depressed against the bias of said yieldable means, each of said legs including means to engage the edge of the hub opening of an automobile wheel upon the spreading of said legs, the last named means being spaced equidistantly from said universal pivot.

2. A device for balancing vehicle wheel and tire assemblies, said device comprising a head having a seat on the longitudinal axis thereof which is adapted to receive a point fulcrum, whereby said head is free to tilt in any direction, a level mounted upon said head, a plurality of legs pivoted on said head at points equally spaced around the periphery thereof, said legs depending from said head but being configurated for disposition in proximity with one another beneath said head, the said legs respectively having notches therein which are positioned equidistantly from said seat and which are adapted to engage the marginal edge of the hub opening of a vehicle wheel when said legs are spread apart, a leg actuator slidably mounted on the head for upward and downward movement thereon, a set of cam surfaces on the leg actuator disposed concentrically with respect to the longitudinal axis of the head, the upper ends of said legs having planar surfaces thereon which, when the lower ends of the legs are disposed in proximity with one another beneath the head, are angulated with respect to the paths in which the cam surfaces move when the actuator is slid upwardly on the head such that the cam surfaces contact and ride along the planar surfaces to spread apart the lower ends of the legs, and yieldable means normally biasing said actuator upwardly on the head to spread said legs.

3. An attachment for balancing wheel and tire assemblies upon the center post of a tire changer machine, said tire changing machine having a horizontal table and means to raise and lower said center post relative to said table, said attachment comprising a head, a bubble level mounted upon said head and adapted to indicate deviations of the head away from the vertical, means including a universal pivot for mounting said head upon the top of the center post of the tire changer machine, a plurality of legs pivotally mounted upon the head and depending therefrom for swinging movement in vertical planes toward and away from the center post upon which the head is mounted, each of said legs being angulated inwardly and terminating in a lower straight portion which is adapted to reside against said center post when said legs are swung inwardly toward one another, a plurality of notches on the outer sides of said legs in the lower portions thereof, said notches being equidistant from said pivot point and adapted to engage the edge of the hub opening of a wheel resting upon the tire changer table surrounding center post, a leg actuator vertically slideably mounted upon said head, yieldable means normally biasing said leg actuator upwardly on said head, said actuator including a first set of cam means adapted to engage the inner sides of said legs to spread said legs upon the upward movement of said actuator under the biasing action of said yieldable means, and a second set of cam means on said actuator adapted to engage the outer sides of said legs to swing them inwardly when said actuator is moved downwardly against the biasing action of said yieldable means.

4. A device to facilitate the balancing of wheel and tire assemblies of automotive vehicles, said device comprising a head having a central fulcrum seat which is adapted to engage a point fulcrum, a universal bubble level carried by said head, the bubble of the level responding to the tilting of the head from vertical in any direction, at least three substantially elongated legs respectively pivotally mounted on said head adjacent to the upper end thereof, said legs being disposed in equally spaced relationship with respect to one another and with respect to the central fulcrum seat, said head presenting an elongated cylindrical surface below the leg pivots, said legs extending along said cylindrical surface and projecting beyond the lower end of said head, the said legs adjacent their lower extremities respectively having means presenting shoulder surfaces which are spaced equidistantly from said fulcrum seat and which are adapted, when said legs are spread, to engage a wheel marginally beyond the hub opening thereof to suspend the wheel assembly from a point fulcrum upon which said seat is rested, a leg actuator slideably mounted upon the cylindrical surface of the head, said leg actuator including a first set of cam surfaces engageable with the inner sides of the respective legs for simultaneously spreading said legs upon sliding movement of said leg actuator upwardly on said cylindrical surface and a second set of cam surfaces adapted to retract said legs simultaneously upon the sliding movement of said leg actuator downwardly on said cylindrical surface, and yieldable means normally biasing said leg actuator upwardly upon said cylindrical surface to spread said legs.

5. A device for balancing vehicle wheel and tire assemblies, said device comprising a head, a level mounted on top of said head, said level being adapted to indicate deviations in any direction of the vertical axis of said head away from the vertical, means including a universal pivot for mounting said head upon the top of a post, three legs pivotally mounted on said head at points equally spaced around its periphery, each one of said legs extending upwardly from the point at which it is pivotally mounted on said head to a point substantially above said level whereby said level is protected by the upper ends of said legs, each one of said legs depending from said head downwardly and being angulated inwardly below said head, a series of notches in the outside of each leg in the lower portion thereof, the notches of the three series being correlated such that corresponding notches in the respective series are equidistantly spaced from the universal pivot and adapted to engage the inner marginal edge of the hub opening of a vehicle wheel when said legs are spread apart whereby said wheel may be suspended from said head, means to actuate said legs, the latter named means being movably mounted upon said head below the leg pivots and having a first set of cam surfaces effective to retract said legs when said latter named means is moved in one direction relative to said head and a second set of cam surfaces effective to spread said legs when said latter named means is moved in the opposite direction upon said head, and yieldable means normally biasing said means to actuate the legs in the direction to spread said legs.

6. A device for balancing vehicle wheel and tire assemblies comprising a cylindrical barrel, a hollow socket piece enclosed within said barrel, a cap enclosing the top of said barrel, universal pivot means interposed between said cap and said socket piece, a level mounted upon the top of said cap, means pivotally mounting three legs at the periphery of said cap, said legs being disposed in equally spaced relationship around the periphery of said cap and being adapted to swing inwardly and outwardly in vertical planes which extend radially from the vertical central axis of said barrel, each of said legs depending from said cap and being angulated inwardly at a point below the lower end of said barrel, whereby the lower endwise portion of said legs may be swung inwardly below said barrel, the upper ends of said legs projecting upwardly beyond the top of said level whereby the level is protected by the upper ends of said legs, a spreader ring slideable vertically on the outside of barrel, said spreader ring including a first set of cam surfaces adapted to engage the inner sides of said legs, a second set of cam surfaces on said spreader ring adapted to engage the outside of said legs, spring means normally urging said spreader ring upwardly, whereby the first set of cam surfaces spreads said legs, said spreader ring being adapted to be depressed manually against the bias of said spring means, whereby the second set of cam surfaces swing said legs inwardly to bring the lower endwise portions thereof underneath of said barrel, and a notch in the outer surface of each leg in the lower endwise portion thereof, the respective notches being spaced equidistantly from said universal pivot means and adapted to engage the inner marginal edge of the hub opening of a wheel surrounding a post upon which said socket piece is seated, whereby the tire and wheel assembly may be freely suspended from said post so that an out of balance condition in the assembly is indicated by the level which is on top of the cap.

7. A vehicle wheel and tire balancing device comprising a head, means including a universal pivot for mounting said head upon a post, a universal level mounted upon said head, said level being responsive to tilting movement of the head on said pivot, at least three elongated legs respectively pivotally mounted upon said head adjacent to the upper end thereof in equally spaced relationship with respect to one another and to said pivot, said legs extending downwardly along the head and projecting substantially beyond the lower end thereof, each leg adjacent its lower end presenting a shoulder surface, the respective shoulder surfaces being spaced equidistantly from said universal pivot and being engageable with the marginal edge of the hub opening in a wheel upon the spreading of said legs, a leg actuator slidably mounted on said head below the leg pivots, a continuous cam surface on said actuator which is concentric to the central axis of said head, said cam surface engageable with the inner sides of said legs to spread said legs for engagement with the edge of a hub opening upon movement of said actuator upwardly on said head, additional cam surfaces upon said actuator engageable with the outer sides of said legs to retract said legs upon sliding movement of said actuator downwardly upon said head and yieldable means normally biasing said leg actuator upwardly on said head to spread said legs.

8. A vehicle wheel and tire balancing device as set forth in claim 7 in which a plurality of projections is provided on the actuator and on the lower end of the head, said projections arranged to be grasped by a person in holding the device, whereby the actuator may be moved downwardly on the head against the force of said bias to retract said legs to enable the person holding the device to insert said legs into the hub opening of a wheel.

9. A device for balancing wheel and tire assemblies of automotive vehicles, said device comprising a head having a central fulcrum seat which is adapted to engage a point fulcrum, a universal bubble level carried by said head, the bubble of the level responding to tilting of the longitudinal axis of the head from vertical in any direction, three elongated legs respectively pivotally mounted upon said head for spreading and retracting movements in planes which radiate from the longitudinal axis of the head, the upper portions of the legs extending alongside of the head and the lower portions of the legs projecting substantially below the head, the legs between the upper and lower portions thereof being of such configuration that the lower portions may be brought into substantial parallelism with one another beneath the head, a leg actuator movably mounted upon the head, cam surfaces on said actuator, parts of the upper portions of the legs being disposed such that when the lower portions of the legs are in substantial parallelism beneath the head said parts are within the paths followed by the cam surfaces upon movement of the actuator in one direction, such movement of the actuator bringing the cam surfaces into contact with said parts to spread the legs, yieldable means carried by said head normally urging said actuator in the direction to spread said legs, and at least one shoulder surface on the outside of each leg, the respective shoulder surfaces being spaced equidistantly from said fulcrum seat.

References Cited in the file of this patent
UNITED STATES PATENTS

| | | |
|---|---|---|
| 879,122 | Saegmuller | Feb. 11, 1908 |
| 1,701,464 | Kraft | Feb. 5, 1929 |
| 1,884,469 | Winter | Oct. 25, 1932 |
| 2,110,343 | Taylor | Mar. 8, 1938 |
| 2,349,288 | Lannen | May 23, 1944 |
| 2,461,591 | Currier | Feb. 15, 1949 |
| 2,493,872 | Henry | Jan. 10, 1950 |
| 2,698,537 | Taylor | Jan. 4, 1955 |